(12) United States Patent
Del Rossa (10) Patent No.: US 12,466,010 B2
(45) Date of Patent: Nov. 11, 2025

(54) BROKEN BOLT REMOVAL TEMPLATE FOR CYLINDER HEAD

(71) Applicant: Milton Industries, Inc., Chicago, IL (US)

(72) Inventor: Jeffrey Del Rossa, Pittsburgh, PA (US)

(73) Assignee: Milton Industries, Inc., Chicago, IL (US)

( * ) Notice: Subject to any disclaimer, the term of this patent is extended or adjusted under 35 U.S.C. 154(b) by 496 days.

(21) Appl. No.: 17/822,541

(22) Filed: Aug. 26, 2022

(65) Prior Publication Data

US 2024/0066643 A1 Feb. 29, 2024

(51) Int. Cl.
*G01B 3/34* (2006.01)
*B23B 47/28* (2006.01)
*B23P 6/02* (2006.01)

(52) U.S. Cl.
CPC .............. *B23P 6/02* (2013.01); *B23B 47/284* (2013.01)

(58) Field of Classification Search
CPC .......... B23B 47/284; G01B 3/34; G01B 3/42; G01B 5/143; G01B 5/20
USPC ................................... 33/562, 600, 604, 605
See application file for complete search history.

(56) References Cited

U.S. PATENT DOCUMENTS

| | | | | |
|---|---|---|---|---|
| 2,018,106 A | * | 10/1935 | Zahodiakin | G01M 13/005 33/562 |
| 2,548,197 A | * | 4/1951 | Conner | B23B 47/287 33/562 |
| 2,827,710 A | * | 3/1958 | Campbell | G01B 5/0032 33/600 |
| 4,787,432 A | * | 11/1988 | Williams | B27F 1/12 144/144.1 |
| 4,813,691 A | * | 3/1989 | Schoenborn | F16J 15/0825 277/924 |
| 4,813,826 A | * | 3/1989 | Riedel | B27F 5/12 33/197 |
| 5,232,228 A | * | 8/1993 | Miyaoh | F16J 15/0831 29/407.01 |
| 5,415,418 A | * | 5/1995 | Stimpson | F16J 15/064 277/598 |

(Continued)

OTHER PUBLICATIONS

U.S. Appl. No. 29/866,239, filed Sep. 2, 2022, Jeffrey Del Rossa.

(Continued)

*Primary Examiner* — George B Bennett
(74) *Attorney, Agent, or Firm* — BUCHANAN INGERSOLL & ROONEY PC (57) ABSTRACT

Embodiments of the apparatus relate to a template used to assist in the removal of broken bolts from an intake manifold mounting fasteners. The apparatus includes a template having a plurality of apertures. When the template is used with a cylinder head, one or more of the apertures is designated as an insertion aperture and one or more of the apertures is designated as a connection apertures. Insertion apertures align with bolt holes of the cylinder head containing broken bolts, and connection apertures align with empty bolt holes of the cylinder head that may be used to secure the template to the cylinder head. The template is used to guide a drill bit or other tools through the insertion apertures as the drill bit or other tool performs work to remove a broken bolt within the cylinder head.

12 Claims, 5 Drawing Sheets

(56) References Cited

U.S. PATENT DOCUMENTS

| | | | | |
|---|---|---|---|---|
| 6,409,178 B1 * | 6/2002 | Raden | ............... | F16J 15/0825 |
| | | | | 277/592 |
| 6,578,282 B2 * | 6/2003 | Haegele | ............... | F02F 1/24 |
| | | | | 33/600 |
| 6,643,945 B1 * | 11/2003 | Starks | ............... | E04G 21/185 |
| | | | | 33/562 |
| 7,024,009 B2 * | 4/2006 | Sanders | ............... | H05K 5/0252 |
| | | | | 381/124 |
| 8,297,891 B2 * | 10/2012 | Collado | ............... | B23B 47/28 |
| | | | | 408/72 B |
| D690,180 S | 9/2013 | Del Rossa | | |
| D694,084 S | 11/2013 | Del Rossa | | |
| 8,782,912 B1 * | 7/2014 | Jensen | ............... | B43L 9/045 |
| | | | | 33/484 |
| 9,132,487 B2 * | 9/2015 | Beydler | ............... | B23B 49/026 |
| D779,921 S | 2/2017 | Del Rossa | | |
| D779,922 S | 2/2017 | Del Rossa | | |
| D779,923 S | 2/2017 | Del Rossa | | |
| 9,658,085 B2 * | 5/2017 | Dastugue | ............... | G01B 5/12 |
| 10,227,960 B2 | 3/2019 | Del Rossa | | |
| 10,458,774 B2 * | 10/2019 | Veit | ............... | G01B 5/20 |
| 10,981,234 B2 | 4/2021 | Del Rossa | | |
| D932,874 S | 10/2021 | Del Rossa | | |
| D952,433 S | 5/2022 | Del Rossa | | |

OTHER PUBLICATIONS

U.S. Appl. No. 17/929,490, filed Sep. 2, 2022, Jeffrey Del Rossa.
U.S. Appl. No. 29/866,066, filed Aug. 26, 2022, Jeffrey Del Rossa.
Canadian Office Action dated Apr. 22, 2025 for Patent Application No. 3,207,344.

* cited by examiner

BROKEN BOLT REMOVAL TEMPLATE FOR CYLINDER HEAD

FIELD OF THE INVENTION

Embodiments of the apparatus relate to a template used to assist in the removal of broken bolts from a cylinder head.

BACKGROUND OF THE INVENTION

An intake manifold is an integral part of an internal combustion engine and is configured to evenly distribute air to the engine's cylinders. An intake manifold is secured to the engine's cylinder head using bolts, and servicing the intake manifold or other components of the engine often requires the removal of these bolts. However, the bolts may be rusted, corroded, or otherwise degraded due to chemical and/or mechanical wear and tear. As a consequence, the bolts may break when attempting to unscrew and remove them, leaving the user with a portion of the broken bolt within the cylinder head. Broken bolts have been found to be a particular concern with the intake manifolds and cylinder heads of Ford 3.5L & 3.7L EcoBoost Engines. Conventional means to remove the broken bolt from cylinder heads are limited to drilling or boring out the broken bolt unassisted. By unassisted, it is meant that the user utilizes a hand-held drill and attempts to remove the broken bolt by boring it out. Attempts to drill the broken bolt without any jig or jig-like component for guiding the location and placement of the drill can result in generating a bore that is too large, not large enough, at an abnormal angle, or through the sides of the bolt. Accordingly, there is a need for a device to assist with the boring out of broken bolts within a cylinder head of an engine. Specifically, there is a need for a broken bolt removal device that is configured to complement the intake manifolds and cylinder heads of Ford 3.5L & 3.7L EcoBoost Engines.

SUMMARY OF THE INVENTION

Embodiments of the apparatus relate to a template used to assist in the removal of broken bolts from a cylinder head. The apparatus includes a template having a plurality of apertures. When the template is used with a cylinder head, one or more of the apertures is designated as insertion apertures and one or more of the apertures is designated as connection apertures. Insertion apertures align with bolt holes of the cylinder head containing broken bolts, and connection apertures align with empty bolt holes of the cylinder head that may be used to secure the template to the cylinder head. The template is used to guide a drill bit or other tools through the insertion apertures as the drill bit or other tool performs work to remove a broken bolt within the cylinder head.

In an exemplary embodiment, an apparatus comprises a template having a first surface and a second surface, wherein the template is placed on a cylinder head such that the second surface abuts the cylinder head. The template further comprises a plurality of apertures in the template, wherein more than one of the plurality of apertures align with bolt holes of the cylinder head.

In some embodiments, the cylinder head is the cylinder head of the Ford 3.5L EcoBoost Engine or the cylinder head of the Ford 3.7L EcoBoost Engine.

In some embodiments, the apparatus further comprises at least one bolt configured to secure the template to the cylinder head.

In some embodiments, the at least one bolt extends from the first surface of the template, exits the second surface of the template, and enters an empty bolt hole of the cylinder head.

In some embodiments, the template is configured to guide a drill bit or other tool as the drill bit or other tool performs work on the cylinder head or a bolt within the cylinder head.

In some embodiments, the second surface complements the shape of the cylinder head.

In some embodiments, at least one of the plurality of apertures is threaded.

In some embodiments, the plurality of apertures comprises one or more insertion apertures and one or more connection apertures, wherein the one or more insertion apertures align with one or more bolt holes of the cylinder head containing at least one broken bolt, and wherein the one or more connection apertures align with empty bolt holes of the cylinder head.

In some embodiments, the apparatus comprises at least one connecting bolt, wherein the at least one connecting bolt extends from the first surface of the template and through the one or more connection apertures, exits the second surface of the template, and enters an empty bolt hole of the cylinder head.

In some embodiments, the one or more insertion apertures are configured to guide a drill bit or other tool as the drill bit or other tool performs work on the cylinder head or the at least one broken bolt within the cylinder head.

In some embodiments, the diameter of the one or more insertion apertures is the same as or smaller than the diameter of the cylinder head bolt hole.

In an exemplary method of removing a broken bolt from a cylinder head, within an environment in which a cylinder head has a plurality of bolt holes and a broken bolt positioned in at least one of the plurality of bolt holes, the method comprises placing a template having a first surface and a second surface on the cylinder head such that the second surface abuts the cylinder head, the template further having a plurality of apertures; aligning at least one of the plurality of apertures with an empty bolt hole; and aligning at least one of the plurality of apertures with the bolt hole containing the broken bolt.

In some embodiments, the method further comprises inserting at least one connecting bolt into the at least one aperture aligned with the empty bolt hole to secure the template to the cylinder head.

In some embodiments, the method further comprises inserting a drill bit or other tool into the at least one aperture aligned with the bolt hole containing the broken bolt; and performing work through the drill bit or other tool to bore out the broken bolt.

In some embodiments, the method further comprises removing the broken bolt from the bolt hole containing the broken bolt.

In some embodiments, the cylinder head is the cylinder head of the Ford 3.5L EcoBoost Engine or the cylinder head of the Ford 3.7L EcoBoost Engine.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Embodiments of the apparatus 100 relate to a template 102 used to assist in the removal of broken bolts from a cylinder head 104. An intake manifold is secured to the engine's cylinder head 104 by inserting bolts into bolt holes within the cylinder. When in service, the intake manifold and its bolts are subjected to chemical and mechanical wear. This can oxidize, corrode, or otherwise degrade the bolts. At times, it may be desirable to remove, replace, or maintenance the intake manifold. However, due to the degraded bolts, the bolts may snap when attempting to unscrew them, resulting in a portion of the bolt still lodged within the bolt hole of the cylinder head 104. Typically, it is the head of the bolt that snaps off from the bolt, leaving the shaft or at least a portion of the shaft of the bolt lodged within the bolt hole. A user is then stuck with a portion of the bolt still lodged within the bolt hole of the cylinder head 104. Because the head of the bolt is disconnected from the bolt shaft, it is difficult, if not impossible, to unscrew the snapped bolt. At this point, the practical course of action is to drill out or bore out the snapped portion of the bolt or replace the cylinder head. Due to the small 6-mm size of the OEM fastener and the small surface area surrounding the fastener, attempts to drill and remove the fastener are largely unsuccessful.

This is where conventional methods are at a disadvantage. Conventional methods rely on a hand-held drill without any jig—i.e., no structure to assist with proper location and positioning or the drill. It is important to only bore out the snapped bolt, thereby leaving the bolt hole intact—i.e., the boring procedure should only drill out portions of the bolt and not any portion of the bolt hole. To the extent possible, the angle of the bolt hole should be maintained during the drilling procedure. Yet, with conventional methods, this is very difficult. It requires tedious concentration and extraordinary care even by the most seasoned mechanic. Even with this extraordinary care, mistakes are not avoidable because it is difficult to hold a hand-held drill in perfect alignment. The inventive apparatus 100, however, provides for a technical solution.

The portion of the bolt lodged within the bolt hole will most likely be the shaft. However, the bolt head or a portion of the bolt head may still be attached. For instance, the bolt head may be stripped, thereby preventing removal via unscrewing the bolt. As another example, the bolt may be so corroded that torqueing the bolt will not cause it to rotate. Thus, the bolt need not be snapped to result in it being lodged within the bolt. Therefore, being lodged as referred to in this disclosure can be any situation in which it is impractical or impossible to remove the bolt by unscrewing it.

The apparatus 100 includes a template 102. The template 102 is a rectangular or square planar member, but can be made into other shapes. Furthermore, the template 102 can be contoured or have surface ornamentation. It is contemplated for the size, shape, and ornamentation to be selected so as to complement the surface ornamentation of the cylinder head 104. The greater the match of surface ornamentations between the template 102 and the cylinder head 104, the more effective the apparatus 100 will be in assisting in the removal of broken bolts from the cylinder head 104 that holds the intake manifold. It is contemplated for the template 102 to be made from a rigid material, such as metal, metal alloy, steel, ceramic, polyurethane, polymer, etc.

The template 102 has a first surface 106 and a second surface 108. The first surface 106 is the surface that is exposed to a user, and the second surface 108 is the surface that abuts the cylinder head 104, and thus at least the surface ornamentation of the second surface 108 should complement that of the surface of the cylinder head 104. The template 102 includes a plurality of apertures 110, the details of which will be discussed next.

Figure 1:
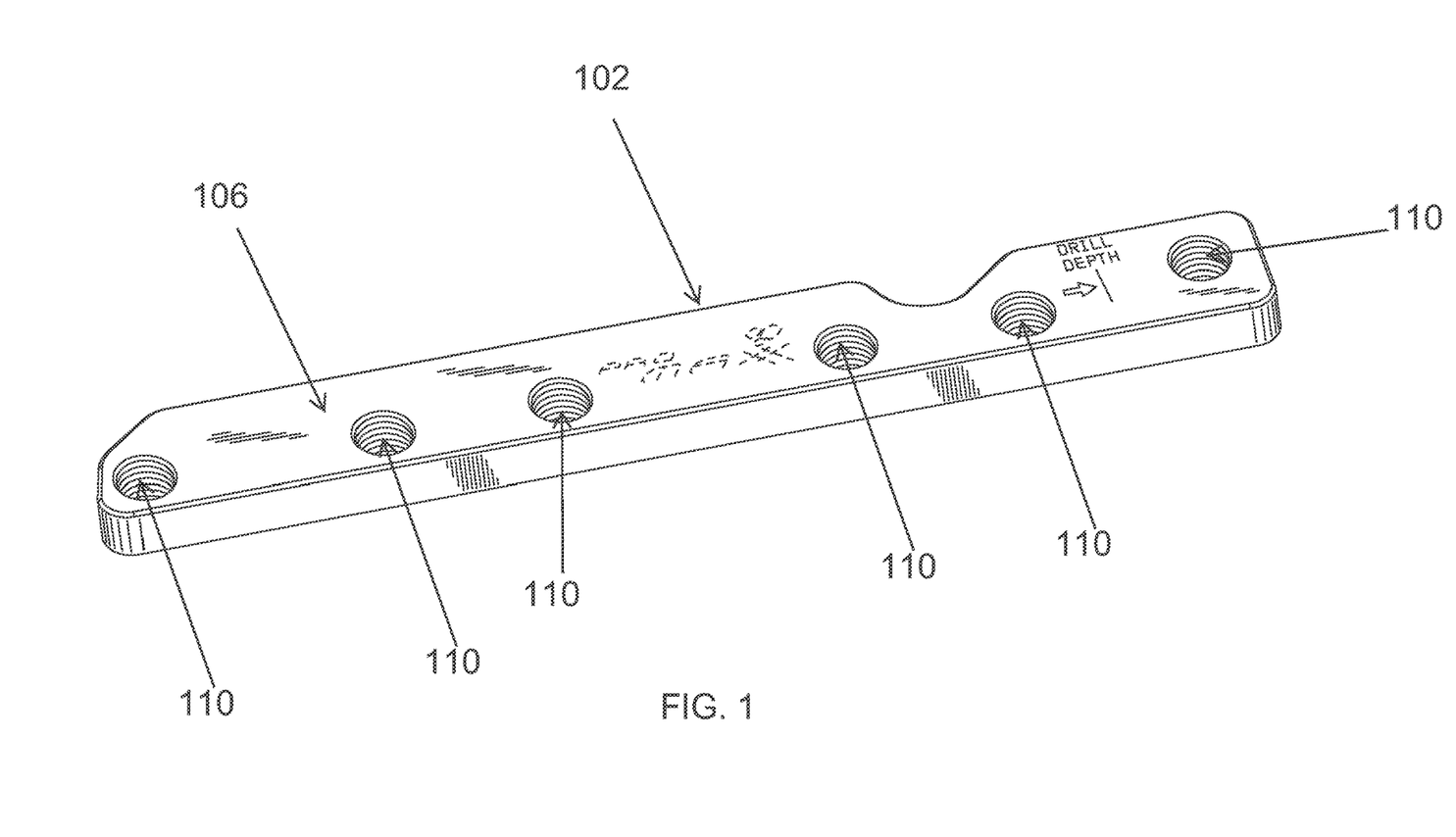
FIGS. 1-2 are perspective views of an exemplary apparatus.
Figure 2:
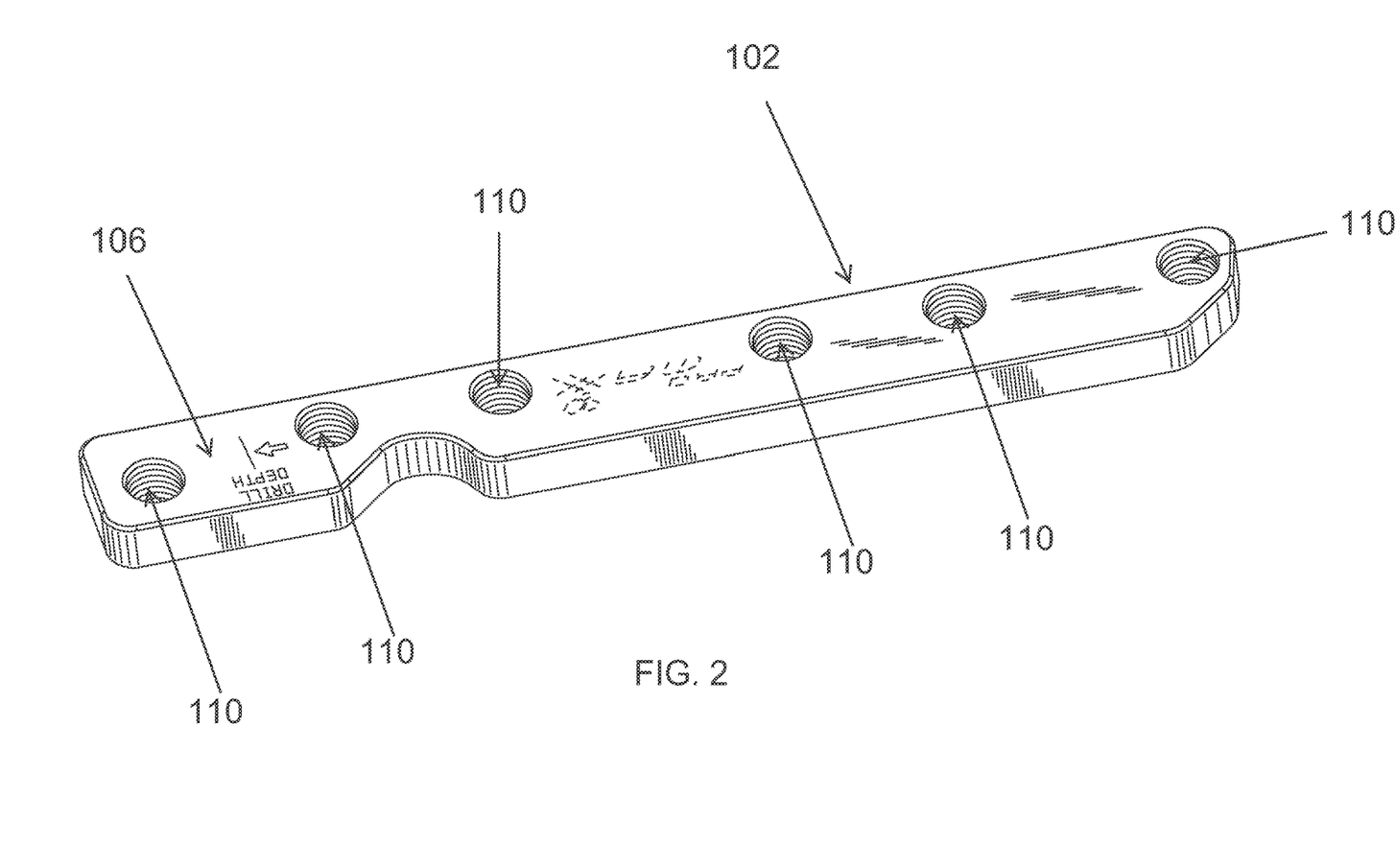
Figure 3:
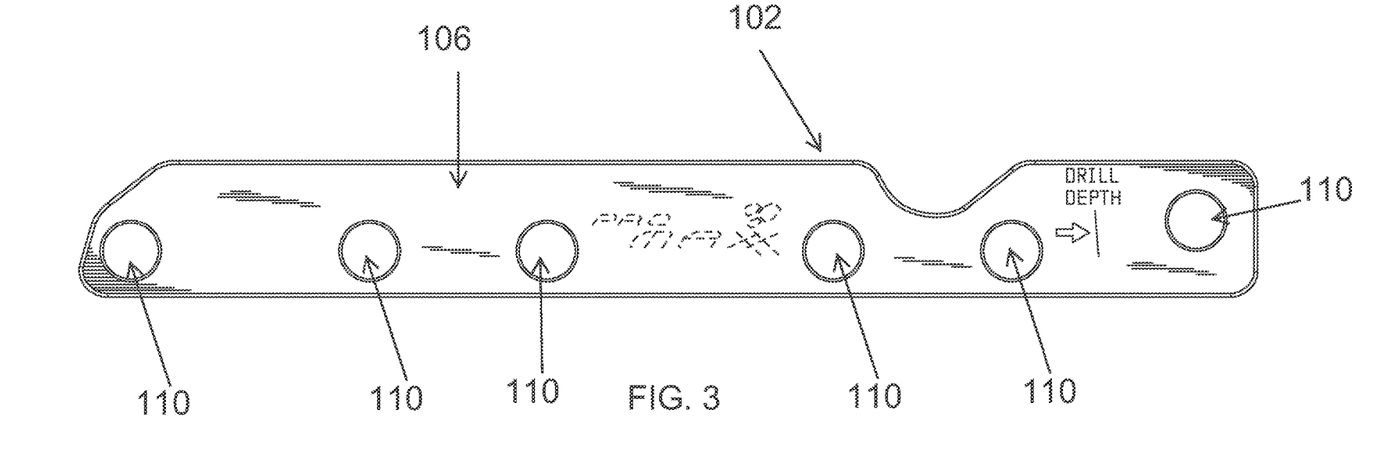
FIG. 3 is a front view of an exemplary apparatus.
Figure 4:
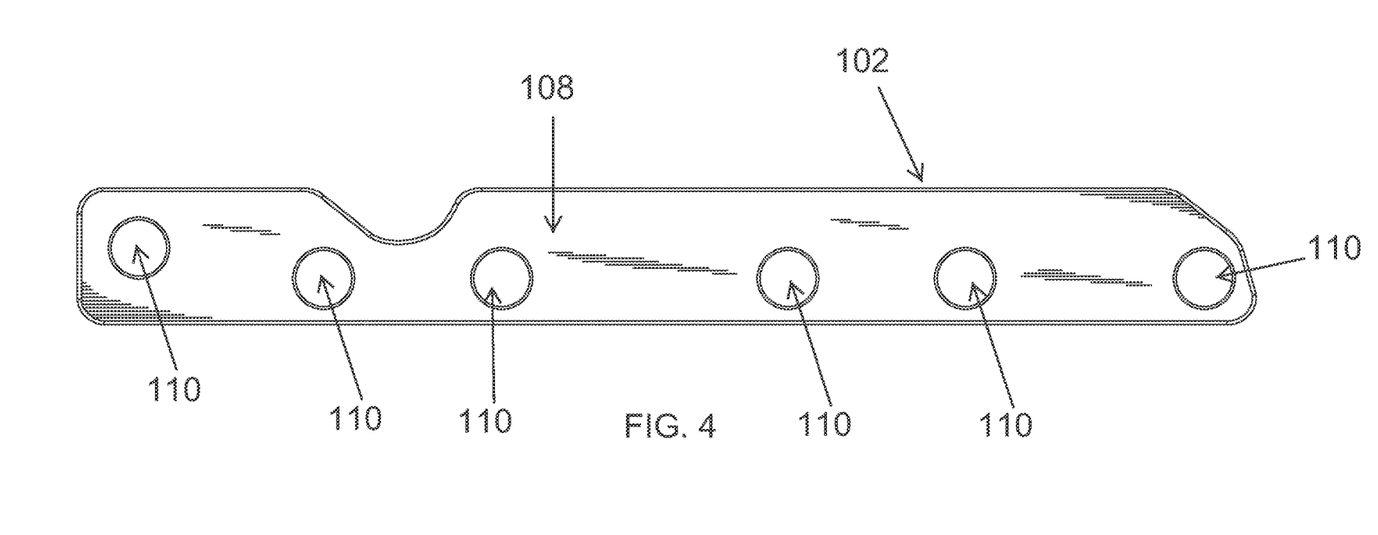
FIG. 4 is a rear view of an exemplary apparatus.
Figures 5, 6, 7:
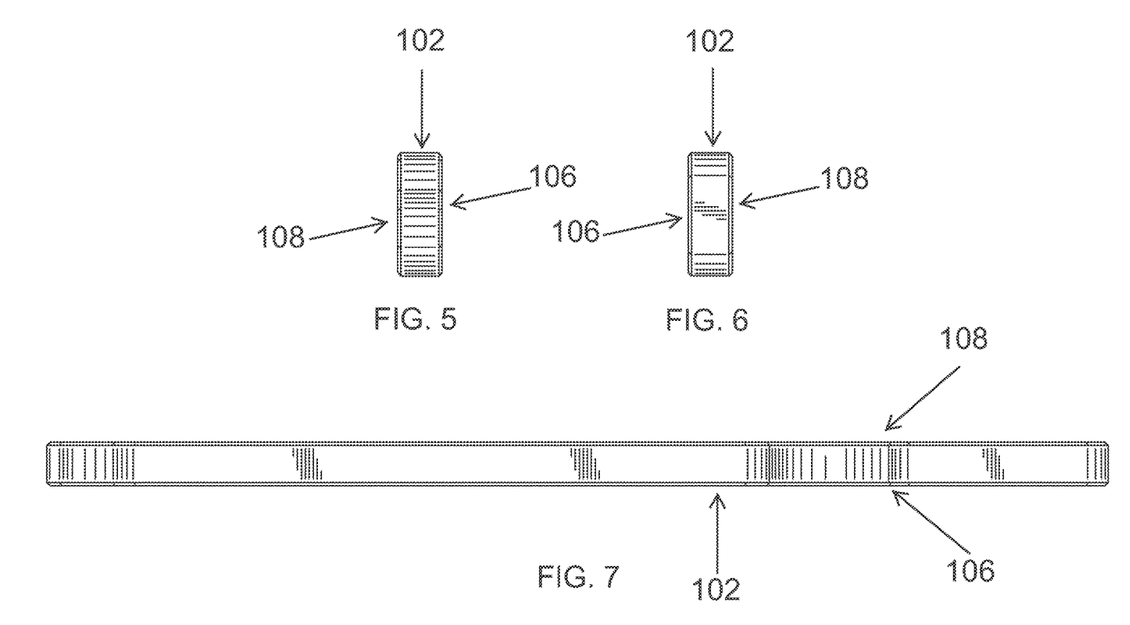
FIG. 5 is a left-side view of an exemplary apparatus.
FIG. 6 is a right-side view of an exemplary apparatus.
FIG. 7 is a top view of an exemplary apparatus.
Figure 8:
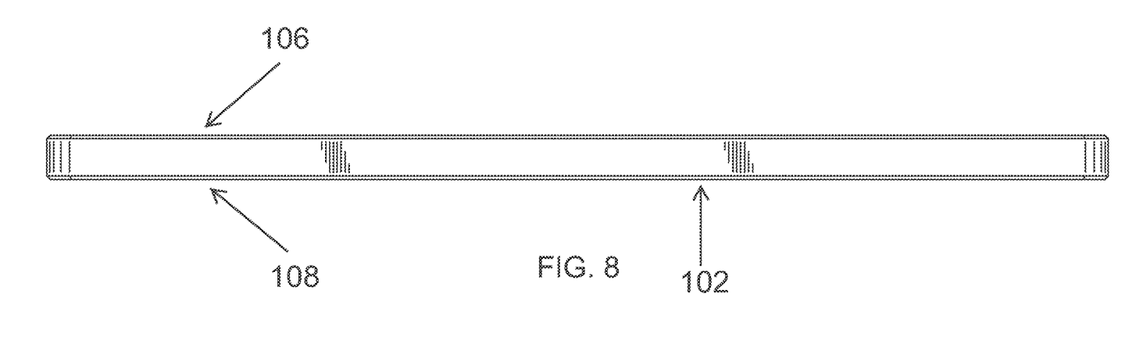
FIG. 8 is a bottom view of an exemplary apparatus.
Figure 9:
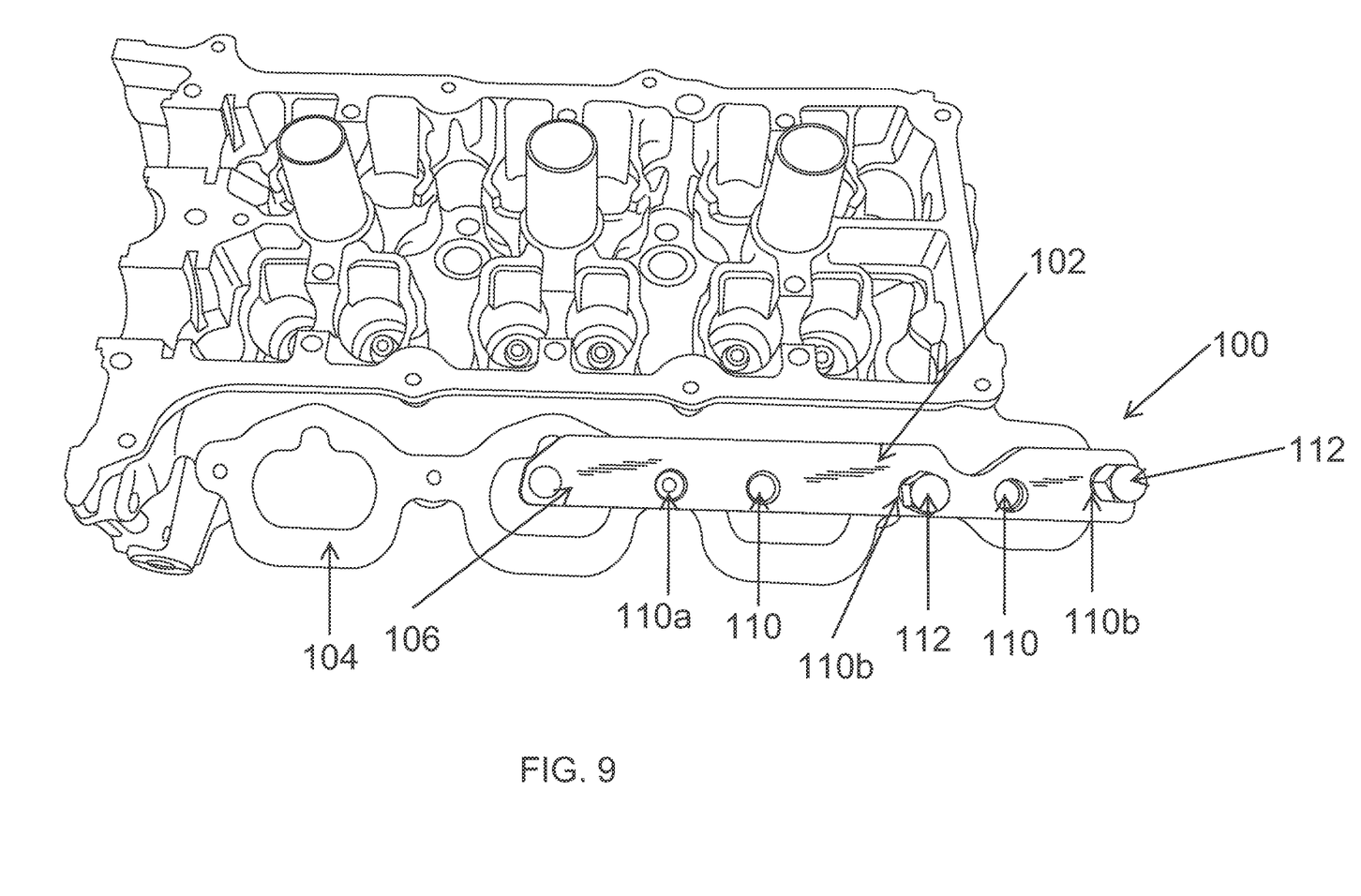
FIG. 9 is an illustration of an exemplary apparatus secured to a cylinder head.

The plurality of apertures 110 are holes formed in the body of the template 102 and extend from the first surface 106, through the body of the template 102, and to the second surface 108. The apertures 110 may have a diameter greater than or equal to the diameter of bolt holes of the cylinder head. The apertures 110 may be threaded so as to allow a user to more tightly attach the template 102 to the cylinder head 104. The apertures 110 may be configured to align with the bolt holes of the cylinder head where the intake manifold fastens. For example, as seen in FIG. 9, the template 102 is contemplated to align with the bolt holes of the cylinder head of Ford 3.5L & 3.7L EcoBoost Engines. It is contemplated that the apertures 110 may each have a different diameter, may each have the same diameter, or may have any number diameters that are the same and/or different. Thus, the apertures 110 may accommodate various bolt sizes and bolt hole sizes. One or more of the apertures 110 may be designated as an insertion aperture 110*a* and one or more of the apertures 110 may be designated as a connection aperture 110*b*. As used herein, apertures 110 generally describes insertion aperture 110*a* and connection aperture 110*b*. In operation, there is at least one insertion aperture 110*a* and at least one connection aperture 110*b*. In operation, insertion apertures 110*a* align with bolt holes of the cylinder head 104 containing broken bolts, and connection apertures 110*b* align with empty bolt holes of the cylinder head 104 that may be used to secure the template 102 to the cylinder head 104.

In operation, the template 102 is placed against the cylinder head 104 so that the second surface 108 abuts the cylinder head 104. The template 102 is positioned such that at least one of the plurality of apertures 110 (e.g., insertion aperture 110*a*) is properly aligned with a bolt hole of the cylinder head 104 containing a broken bolt, and at least one of the plurality of apertures 110 (e.g., connection aperture 110*b*) is properly aligned with an empty bolt hole of the cylinder head 104. Being aligned properly means that the aperture 110 overlies and is coaxial with the bolt hole of the cylinder head 104. After the template 102 is in position, the user may insert one or more bolts 112 into the connection apertures 110b. A bolt 112 may extend from the first surface 106, through the body of the template 102, exit the second surface 108, and enter the empty bolt hole of the cylinder head 104. It is contemplated that there may be as many bolts 112 and connection apertures 110b as there are empty bolt holes of the cylinder head 104. In other words, a user may align more than one connection aperture 110b with more than one empty bolt hole of the cylinder head 104 and thereafter insert more than one bolt 112 into the aligned connection aperture 110b and bolt hole of the cylinder head 104.

After the one or more bolts 112 are in place, the apparatus 100 can now be used as a guide to assist a user in the location and placement of the drill when attempting to drill out the lodged bolt. A user uses the insertion apertures 110a to insert the drill bit or other tool there-through to perform the required work for drilling out the lodged bolt within the bolt hole of the cylinder head 104. It is contemplated that each insertion aperture 110a is configured ensure that a drill bit or other tool that is too large is not used. For instance, the diameter of the insertion aperture 110a can coincide with the diameter of the cylinder head bolt hole so as to ensure that no drill bit or other tool with a diameter that is larger than that of the cylinder head bolt hole is used.

With conventional methods and apparatuses, as the user employs the drill, the drill bit within the bolt hole can wander (i.e. move laterally) and misalign from the failed bolt. Wandering is undesirable because it can make it more difficult to drill out the bolt efficiently and error in drilling either into the mounting threads of the cylinder head, or the cylinder head. In addition, the wandering drill bit can make contact with and damage the internal walls of the bolt hole. The inventive methods and apparatuses disclosed herein, however, can involve inserting a drill bit through the aligned or co-registered insertion aperture 110a so as to make contact with the failed bolt. The apparatus 100 is used maintain the drill bit in proper alignment before, during, and/or after actuation of the drill bit. Actuating the drill bit can involve causing the drill bit to rotate about an axis of the drill bit and/or to move in a direction parallel to the axis of the drill bit. Proper alignment can include maintaining the drill bit at an orientation that is co-axial with the bolt hole and/or preventing the drill bit from moving laterally so as to misalign or not co-register with the bolt hole.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of the apparatus and methods of making and using the same have been discussed and illustrated herein, it is to be distinctly understood that the invention is not limited thereto but may be otherwise variously embodied and practiced within the scope of the following claims.

What is claimed is:

1. An apparatus, comprising:
   a template having a first surface and a second surface, wherein the template is placed on a cylinder head such that the second surface abuts the cylinder head;
   a plurality of apertures in the template, wherein more than one of the plurality of apertures align with bolt holes of the cylinder head, wherein the plurality of apertures comprise:
      one or more insertion apertures aligned with one or more bolt holes of the cylinder head containing at least one broken bolt, wherein the diameter of the one or more insertion apertures is the same as or smaller than the diameter of the one or more bolt holes of the cylinder head, and
      one or more connection apertures aligned with one or more empty bolt holes of the cylinder head; and
   at least one connecting bolt, wherein the at least one connecting bolt extends from the first surface of the template and through the one or more connection apertures, exits the second surface of the template, and enters an empty bolt hole of the cylinder head.

2. The apparatus of claim 1, wherein the cylinder head is the cylinder head of the Ford 3.5L EcoBoost Engine or the cylinder head of the Ford 3.7L EcoBoost Engine.

3. The apparatus of claim 1, wherein the template is configured to guide a drill bit or other tool as the drill bit or other tool performs work on the cylinder head or a bolt within the cylinder head.

4. The apparatus of claim 1, wherein the second surface complements the shape of the cylinder head.

5. The apparatus of claim 1, wherein at least one of the plurality of apertures is threaded.

6. The apparatus of claim 1, wherein the one or more insertion apertures are configured to guide a drill bit or other tool as the drill bit or other tool performs work on the cylinder head or the at least one broken bolt within the cylinder head.

7. A method of removing a broken bolt from a cylinder head, comprising:
   within an environment in which a cylinder head has a plurality of bolt holes and a broken bolt positioned in at least one of the plurality of bolt holes:
      placing a template having a first surface and a second surface on the cylinder head such that the second surface abuts the cylinder head, the template further having a plurality of apertures, wherein the plurality of apertures comprise one or more insertion apertures and one or more connection apertures;
      aligning at least one of the one or more connection apertures with an empty bolt hole;
      aligning at least one of the one or more insertion apertures with the bolt hole containing the broken bolt, wherein the diameter of the one or more insertion apertures is the same as or smaller than the diameter of the one or more bolt holes of the cylinder head; and
      inserting at least one connecting bolt into the at least one of the one or more connection apertures.

8. The method of claim 7, further comprising:
inserting a drill bit or other tool into the at least one of the one or more insertion apertures aligned with the bolt hole containing the broken bolt; and
performing work through the drill bit or other tool to bore out the broken bolt.

9. The method of claim 8, further comprising:
removing the broken bolt from the bolt hole containing the broken bolt.

10. The method of claim 7, wherein the cylinder head is the cylinder head of the Ford 3.5L EcoBoost.

11. The apparatus of claim 1, wherein the template is formed from a material selected from the group consisting of metal, metal alloy, ceramic, polyurethane, and polymer.

12. The apparatus of claim 1, wherein the template is formed from a material selected from the group consisting of metal and metal alloy.

* * * * *